3,562,043
LAMINATED STRUCTURE AND METHOD OF MAKING THE SAME
Robert G. Eddy, 20 Casablanca Court,
Elnora, N.Y. 12065
Filed Sept. 12, 1967, Ser. No. 667,181
Int. Cl. B32b 5/18
U.S. Cl. 156—79       13 Claims

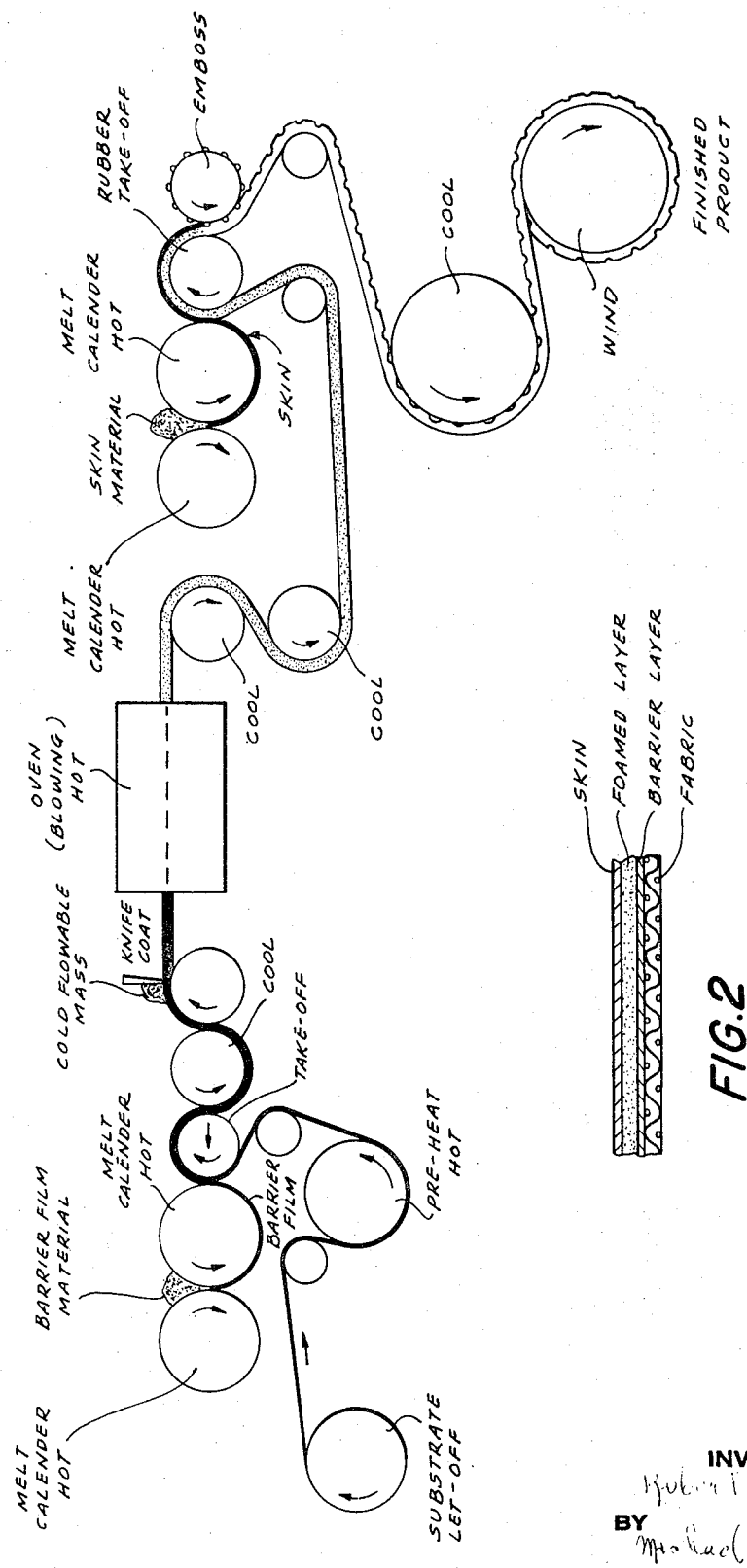

ABSTRACT OF THE DISCLOSURE

A laminated structure is formed by bonding to a carrier, for instance a textile sheet, a pre-formed, shape-retaining, intermediate layer or film; the carrier face being formed with projecting and recessed portions and the intermediate layer being bonded to the carrier in such a manner as to contact substantially only the projecting portions of the latter. On the free face of the intermediate layer is then formed a layer of hardenable material in flowable condition, which layer must be fusible to the intermediate layer and may contain a blowing agent. The hardenable layer is then hardened (and simultaneously fused to the intermediate layer and also simultaneously blown if a blowing agent is present). Thereby a laminated structure is formed substantially without filling the recessed portions of the carrier face, due to the interposition of the preformed intermediate film or the like.

BACKGROUND OF THE INVENTION

The present invention is concerned with a laminated structure best exemplified by a textile sheet carrying on one face thereof a porous layer which may serve to simulate leather. Such structures were produced by coating a substrate such as a textile sheet with a latently foamable mass, for instance with a polyvinyl chloride plastisol having a blowing agent incorporated therein, and by solidifying the plastisol layer and activating the blowing agent, a more or less leather-like layer was formed on the substrate.

However, to proceed in this manner is connected with several disadvantages. The plastisol, upon being applied to the textile layer or the like will tend to fill the interstices thereof and also to enter the capillaries of the textile fibers. This will not only increase the consumption of plastisol, but will also cause locking of the textile material so that the final product will not posses the desired flexibility.

It is an object of the present invention to overcome these difficulties and disadvantages and to provide a laminated structure and a method of making the same which will give the desired result with a lesser consumption of plastisol or the like and substantially without reducing the flexibility of the product.

SUMMARY OF THE INVENTION

In its broadest aspects, the present invention is concerned with a laminated structure which comprises a substrate formed with projections and recesses, a continuous film or layer adhering to the projecting portions of the substrate but not substantially penetrating the recesses, and an outer layer compatible with the material of the continuous film and fused to the outer face thereof. According to preferred embodiments of the present invention, the outer layer is a porous layer formed by incorporating in the material of the outer layer a blowing agent and activating the latter.

Such laminated or composite structures are formed, according to the present invention, by first adhering a preformed film to the projecting portions of the surface of the substrate. The substrate, for instance, may be a textile sheet and the preformed film may consist of a thermoplastic material and may be adhered to the textile substrate in slightly softened condition in which such thermoplastic film for instance, a polyvinylchloride sheet, possesses adhesive properties. It is also with the scope of the present invention, to adhere the pre-formed film to the projecting portions of the substrate by different methods, for instance by applying an adhesive to the contacting face of the substrate and/or the preformed film. However, the last-mentioned method is frequently less desirable for reasons which will be discussed further below.

An outer layer is then formed on the free face of the thus adhered continuous intermediate film or layer, by applying thereto, for instance, a plastisol in flowable or spreadable condition. The layer or coating which is thus formed on the free face of the intermediate layer may contain a latent blowing agent or may include a pre-blown material. This outer layer or coating is then solidified and simultaneously fused to the intermediate layer, If a blowing agent had been incorporated in the material forming the outer layer, such blowing agent will be activated and thus the final, solidified outer layer will have a porous structure.

By proceeding in this manner it will be achieved that material of the outer layer will not penetrate into the recesses, pores, interstices or capillaries of the substrate, due to the interposition of the pre-formed barrier layer or film. This will result in significant savings of material of the outer layer, such as realtively expensive plastisol, and, due to the fact that the recesses or the like of the substarte will remain unfilled, no locking of the substrate will occur and the same will substantially retain its original flexibility.

In many cases, the substrate or carrier will be a sheet of fibrous material, for instance a paper or textile sheet, and in the case of textile sheets, the carrier may be produced by any of the conventional techniques and, for instances, may consist of a woven, non-woven or knitted fabric.

Good results are achieved, according to the present invention, for instance, by adhering to a textile carrier a pre-formed intermediate layer of polyvinylchloride, and forming the outer layer of a polyvinylchloride plastisol having a blowing agent incorporated therein.

It is also within the scope of the present invention to emboss the outer face of the outer layer or to form thereon (particularly if the outer layer is a porous layer) a skin, either by treating the outer face of the outer layer in manners known per se so as to form a skin thereon, or by adhesively or otherwise adhering a pre-formed skin layer thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic elevational view of an arrangement for carrying out the method of the present invention; and FIG. 2 is a cross-sectional view of an example of a laminated structure in accordance with the present invention.

DESCRIPTION OF THE PREFERRED EMBODIMENTS

As pointed out above, the substrate or carrier portion of the laminated or composite structure of the present invention may be any shape-retaining material having a face which is formed with projections and recesses. Thus, the substrate, for instance, may be a porous metal sheet. However, in accordance with preferred embodiments of the present invention, the substrate is a textile material such as a woven, knitted or non-woven or felted fabric. In the case of woven fabrics, the same should possess sufficient tensile breaking strength, generally a minimum of 4 grams per inch in warp and weft direction, and in the case of other type textile materials substantially similar characteristics will be desired. Furthermore, the textile substrate (or for that matter any substrate) should have a sufficient resistance to thermal exposure, such as maintenance of the required minimum tensile breaking strength after exposure for two minutes to at least 250° F.

Suitable textile substrates include those having high and low relative cover factors and high and low air permeability.

Good results are obtained, for instance, with the following types of textile substrates:

(1) Circular knitted cotton jersey of ¼ yard to 8 yards per pound yield on a basis width of 60".

(2) Woven cotton drill 2.25 yards per pound yield on a basis width of 58" (as an example of a typical commercial quality industrial fabric).

(3) Woven cotton sheeting of any commercial weight, including lightweight structures such as the typical 58"—32 x 28 (7.70 yield) cheesecloth.

(4) Non-woven fabrics meeting the tensile and thermal requirements above stated. Including amongst other types: adhesively bonded, felted, needle-punched, correasous, spun-bonded non-woven substrates.

Suitable carriers also include paper, films, webs and belts, and generally any materials to which the preformed intermediate film or the like may be adhered.

As pointed out above, the recesses, interstices or the like of the substrate, such as the yarn crowns of a substrate fabric, are bridged by an intermediate layer consisting of a pre-formed film. In other words, the film is not formed in contact with the substrate but a previously formed film is adhered substantially only to the projections of the substrate surface.

If, as frequently will be the case, a plastisol is applied to the intermediate layer for forming the outer layer thereon, the intermediate layer should be impermeable to such plastisol under the operating conditions of forming the outer layer. Thus, in many cases, the intermediate layer will consist of a thermoplastic membrane which is impermeable to the plastisol for a sufficient long time to allow further processing of the plastisol into the outer (possibly blown) layer. Such thermoplastic membrane preferably will have a thickness of between about 0.00025 inch and 0.005 inch, corresponding to an approximate weight add-on of between ¼ and 5 ounces per square yard.

The desired chemical and physical characteristics of such barrier film include the following:

(a) good bondability to the substrate
(b) soft supple hand (low bending modulus)
(c) temporary impermeability to a subsequently applied foamable vinyl plastisol in non-Newtonian liquid state
(d) good adhesive bond upon oven fusion to the subsequently applied foamable vinyl plastisol
(e) thermoplastic melt flow characteristics which render the film semi-molten at a temperature within the range of 250° F. to 450° F. coincidentally with chemical and physical changes which are taking place within, for instance, a foamable vinyl plastisol of which the outer layer is to be formed. Such changes include increase of viscosity, gelatinization, expansion due to release of gas upon activation of blowing agent, and fusion.

When it is desired to obtain an air-permeable composite or laminated structure including, for instance, an outer layer of blown (expanded) polyvinylchloride, the plastic flow of the material of the intermediate layer or barrier membrane may be so adjusted in a manner known to those skilled in the art that the intermediate film or membrane will become discontinuous upon exposure for a given length of time to the elevated blowing temperature. This can be easily adjusted in such a manner that at the time when the barrier membrane ceases to be continuous, the material of the outer layer is sufficiently solidified so as not to penetrate through the newly formed openings in the barrier layer into the recesses of the substrate.

It is a further advantage of rendering the intermediate or barrier layer discontinuous that it will make the composite structure more supple and leather-like by reducing any locking of the substrate yarn structure which may have been caused by adhering of the barrier layer thereto.

In certain preferred embodiments of the present invention, it is the initial function of the intermediate film or barrier membrane to form a smooth impermeable surface on the substrate, for subsequent coating with a liquid, or at least spreadable, foamable vinyl plastisol.

Direct application of the foamable vinyl plastisol liquid to the fabric substrate would cause penetration of the plastisol liquid into the fabric interstices and into the fibrous structure of the yarn. This would detrimentally affect the bending characteristics and the soft, supple, leather-like characteristics of the final product. Another undesirable consequence of penetration of the foamable plastisol into the interstices of the fabric structure would be the resulting uneven distribution of the plastisol across the plane of the fabric. The interstices would contain more foamable plastisol and, after foaming, more foamed material, than the crowns or projections. This would result, after foaming, in an uneven surface and a magnified representation of the initial fabric structure by the expanded, foamed material of the outer layer. Furthermore, any filling of, for instance, the interstices of the woven fabric with a filler material, in order to thereby preclude the foamable plastic from entering the interstices, would cause locking of the yarn structure. The thus obtained product would not have the desired soft supple hand of leather. All these difficulties and disadvantages are obviated by the interposition of the barrier layer in accordance with the present invention which will also permit forming of the desired outer layer with a minimum of material since no material will be lost by penetration of the substrate.

It is thus essential, according to the present invention, that the intermediate film or barrier layer be a pre-formed film, offering a smooth and essentially non-penetrable surface for the subsequently applied plastisol coating. To proceed in accordance with the present invention appears to be particularly advantageous for directly foam coating an open fabric structure.

The intermediate layer or barrier film or membrane may be applied to the substrate, so as to adhere to the projections thereof, in a variety of ways which include the following methods:

(1) A thin film of semi-molten or molten plastic material is metered from a bank formed between hot calender rolls. While being conveyed on one of the heated calender rolls, the semi-molten film is brought into contact with the preheated substrate and the two materials are pressed together by calender nip of suitable pressure to cause the film to adhere to the substrate. The composite of barrier film and substrate is removed from the hot calender roll and cooled to render the semi-molten barrier membrane solid and at least for a limited period of time plastisol impermeable.

(2) A pre-formed thin plastic film is pre-heated on a carrier roll or endless belt. A pre-heated substrate fabric is slightly pressed into the semi-molten plastic film and the composite semi-molten plastic film and substrate is removed from the carrier and cooled.

(3) A thin plastic film is extruded by suitable means and a pre-heated substrate is calendered or laminated to the warm thermoplastic film and the composite is cooled.

(4) The substrate in any of the above instances may be pre-treated or primed with a suitable adhesive and the pre-heating step may be eliminated. Likewise, the pre-formed thermoplastic barrier film may be coated or treated with an adhesive to allow it to be applied directly to the fabric substrate without re-heating.

In all these cases, contact between the barrier film and the substrate should be sufficiently strong to cause adherence of the barrier film to the projections of the substrate.

It is important that the material of the intermediate barrier layer is compatible with and fusible to the material of the outer layer. This will now be discussed in detail with respect to an outer layer formed of polyvinylchloride or containing a substantial proportion of polyvinyl chloride or a copolymer thereof.

In such case, the barrier film should contain per 100 parts of resin between 10 and 100 parts of polyvinylchloride homopolymer or copolymer resin.

The balance of the barrier film composition, if any, may include other resins such as acrylic polymers, for instance the product marketed by Rohm & Haas under the trade name "Acryloid K120–N," or a thermoplastic polyurethane elastomer, for instance the product marketed by B. F. Goodrich under the trade name "Estane."

The barrier film composition may contain a suitable plasticizer system for endowing the barrier film with a supple hand and suitable melt flow. Suitable plasticizer ingredients include DOP (dioctylphthalate); NODA (n-octyl n-decyl adipate); BBP (butylbenzylphthalate); monomeric epoxy esters, and other.

In addition, fillers, extenders and pigments may be included in the barrier film formulation in order to reduce costs or to impart color.

Furthermore, stabilizers of the barium-cadmium-zinc, lead or organotin type may be incorporated to reduce thermal degradation of the vinyl resin.

The following example will show a suitable formulation of the barrier film or intermediate layer. It should be noted, however, that this example, as well as the examples following further below, are given as illustrative only, without limiting the invention to the specific details of the examples.

EXAMPLE I

Barrier film composition

| | Parts by weight |
|---|---|
| Polyvinylchloride, homopolymer resin | 90 |
| Acrylic polymer | 10 |
| Dioctylphthalate | 30 |
| Butylbenzylphthalate | 15 |
| Barium-cadmium stabilizer | 4 |
| Stearic acid | ½ |
| Calcium carbonate, filler pigment | 5 |

The outer layer will now be described particularly with respect to a foamable vinyl polymer layer, however, it again noted that the present invention is not to be considered limited to this preferred embodiment.

The outer layer may be formed of a plastisol containing a conventional blowing agent such as azobisformamide. It is noteworthy that the same compositions or formulations which may be used in the conventional release paper casting method may also be used for the process of the present invention, however, without requiring release paper and special paper handling equipment.

A typical formulation which is suitable for the release paper technique as well as for the process of the present invention, is given in the following example:

EXAMPLE II

Outer layer composition

| | Parts by weight |
|---|---|
| Exon 654 (a polyvinylchloride resin made by Firestone) | 100 |
| DOP | 50 |
| DDA (dodecyl adipate) | 25 |
| Plastolein 9720 (a plasticizer on the basis of esters and polyesters of azaleic and pelargonic acids, marketed by Emery Industries) | 15 |
| Paraplex G–62 (a plasticizer on the basis of polyesters and epoxides, marketed by Rohm & Haas) | 5 |
| Ba-Cd-Zn stabilizer | 7 |
| $TiO_2$ pigment | 7 |
| Kempore R–125 blowing agent (1,1'-azobisformamide) | 2 |

It is also possible to form on the barrier membrane which has been adhered to the substrate, a layer of pre-whipped gas entrapping or air-entrapping type foams and froths. These froths, commonly known as Vanderbilt or Euromatic foams, contain a large percentage of open and interconnecting cells and, for this reason, are sometimes termed "breathable vinyl foams." They have very thin cell walls and consequently a low bond strength when directly applied to fabric substrates. The interposed barrier film membrane will assure good bonding of these breathable vinyl foams to the substrate without penetration into the weave interstices and, consequently, the relatively expensive foam material will be fully used to impart thickness. Furthermore, the subsequent oven curing of the composite structure may render the intermediate membrane discontinuous and therefore also breathable.

Referring now to the drawing, and particularly to FIG. 1, it will be seen, by way of example, that a substrate sheet may pass from a let-off roll over a pre-heating roll and from there over a take-off roll at which point the preheated substrate is contacted with the barrier film which had been formed between a pair of hot melt calender rolls. At the take-off roll the barrier film is adhered (for instance thermoplastically) to the projections of the adjacent face of the substrate. After passing over a cooling roll, the thus formed two-layer, composite sheet reaches a coating roll at which a coat of a foamable plastisol is applied to the free face of the barrier film in the form of a cold-flowable mass. The thus formed three-layer structure then passes through an oven and is heated therein to a temperature sufficiently high to cause activation of the blowing agent which had been incorporated in the plastisol, and also to cause breaking down of the plastisol to form a hot outer layer of the plastic material, for instance polyvinylchloride.

The thus formed three-layer structure then passes over a pair of cooling rollers.

If desired, a skin layer may be applied as a preformed film to the free surface of the foamed outer layer, as illustrated in the right-hand portion of FIG. 1. Furthermore, if desired, the three-layer structure (or four-layer structure, if a skin layer had been applied) may still pass through an embossing roller arrangement, prior to final cooling and, optionally, winding up on a storage roll.

FIG. 2 illustrates a cross-section through a laminated structure formed on the device shown in FIG. 1. Reference numeral 1 denotes the substrate, in this case a woven fabric. The barrier layer which adheres to the projections of the upper face of substrate 1 is indicated by reference numeral 2. Foamed layer 3 is fused to the free face of barrier layer 2 and, in turn, covered by skin layer 4.

The flowable material forming the outer foamed layer may be applied to the free face of the barrier layer by means of a standard reverse roll coater or a knife over roll coater to meter a uniform thickness of foamable plastisol liquid onto the barrier film which previously had been adhered to the substrate.

However, when the material for the outer foamed layer is a pre-whipped gas entrapping material, it is preferred to use a knife over roll type coater with the gap between the knife and the surface of the intermediate or barrier film set to the desired thickness, since the foam froth would be collapsed by roller coaters.

The composite structure thus formed according to the present invention and consisting essentially of the substrate, barrier film and foamable or foamed outer layer is then passed through an oven. In the case of polyvinylchloride layers, the air temperature in the oven preferably will be between 330 and 460° F. High velocity hot air type ovens are very suitable for the present process since they provide more uniform heat than other oven types. However, it is also possible to use other oven types, such as ovens providing radiant infra-red heat, dielectric heat, contact heat, etc.

Typical oven conditions for treating polyvinylchloride-containing foamable outer layers coated onto compatible barrier layers may be as follows:

Oven temperature—420° F.
Oven length—60 ft.
Air capacity—720 cu. ft.
Air exchange—10,000 c.f./min.
Max B.t.u. input—2,000,000
Composite mass—16 oz./yd.$^2$
Residence time—1 min.
Foam weight—12 oz./yd.$^3$
Foam thickness—.040″.

Comparative tests have shown that the foam-coated material may be produced as described above with an oven residence time which is 30% less than the residence time required by the conventional release paper casting method. This may be due to lower oven loading and the absence of an insulating layer of paper when proceeding in accordance with the present invention.

Further tests indicate that generally the amount of relatively costly chemical blowing agent which is required according to the present invention is at least about 25% less than the amount required by conventional processes, such as the Roggi/Uniroyal process, for producing foams of equivalent thickness and density. The calender-producing foams are limited in thickness by the calender to a maximum of approximately 20 oz. per square yard. The foam layers produced according to the present invention are limited only by the capacity of the oven at a given thickness of the foam layer. Thus, it is possible, for example, to produce in accordance with the present invention foams of 50 oz. per square yard and a thickness of 0.300 inch.

It may be stressed once more that, due to the interposition of the barrier film, the entire foamable material will be utilized for forming the foam layer of uniform thickness and thus the losses which are incurred according to conventional processes by embedding at least surface portions of the substrate into the liquid or semi-gelled foam-forming plastisol are avoided and no portion of the foam is lost in the interstices and fiber structure of the substrate. Nevertheless, due to its compatibility with, and fusibility to, the barrier layer, the foamed layer will be firmly adhered to the substrate. Thus, on the basis of unit weight and equivalence of bonding strength, providing a barrier film in accordance with the present invention is a less costly and more effective manner of securing the foamable plastic coat to, for instance, a fabric substrate.

In most imitation leather and other expanded vinyl fabrics which are intended for end-uses which subject the surface to abrasive wear the fragile foam surface is protected by a more durable skin coat. After the foam has been oven-fused and blown, a skin may be applied to the composite structure obtained according to the present invention, by mechanical means and processes similar to those described in connection with applying the preformed barrier film to a substrate.

By applying such skin or skin layer, a composite or laminated structure corresponding to that illustrated in FIG. 2 will be obtained.

If it is required that the final product be breathable, for instance a gas permeable composite leather imitation, a gas permeable skin layer may be applied, and the barrier film will be so composed as to become molten and subsequently gas permeable in the oven during foaming and fusing of the foamable outer layer (however, this will be so arranged that at the point at which the barrier layer would become permeable for the material of the outer layer the latter will already be foamed and solidified to such an extent that it will no longer be capable of penetrating through the barrier layer).

EXAMPLE III

Forming a breathable laminated structure including a mechanical froth-type air-entrapment foam layer.

The froth-type air-entrapment foam may be of the type commercially available under the trade name "Vanderbilt Foam" from Vanderbilt Co., New York, or under the trade name "Stork Eur-o-matic" from Gebr. Stork & Co., Holland.

(1) Barrier film formula

|  | Pts. by wt. |
|---|---|
| Polyvinylchloride, homopolymer resin | 100 |
| Dioctylphthalate | 30 |
| Butylbenzylphthalate | 15 |
| Barium-cadmium stabilizer | 4 |
| Stearic acid | ½ |
| Calcium carbonate filler | 5 |

Weight of barrier film applied, 2.0 oz./yd.$^2$ (2) Substrate 4.0 yd./lb. cotton jersey 60″ wide.

(3) Foam coat formula

|  | Pts. by wt. |
|---|---|
| P.V.C. resin (B. F. Goodrich Geon 121) | 100 |
| Butylbenzylphthalate | 45 |
| Dioctylphthalate | 35 |
| Epoxidized soybean oil | 5 |
| Barium-cadmium stabilizer | 3 |
| Emulgator OTS (Chemische Werke Huels) | 2 |
| $K_2CO_3$ (solution—50% $H_2O$) | 3 |
| Oleic acid | 7 |

(4) Frothing procedure

Meter proportioned quantities of above foam formula and specific volume of air continuously into a suitably chilled and jacketed high intensity agitator and mixer to disperse and entrap air into the plastisol to form a froth. The exit pipe of the above mixer feeds directly into the knife coating bank as previously. The proportion of air and plastisol fluid entering the mixer is controlled to yield a foam of 15 lb./cu. ft. density.

(5)

The thus formed foam froth is metered onto the barrier film, which previously has been adhered to the substrate, in an amount equal to 12 oz. per square yard.

(6)

The thus formed three-layer structure (substrate, barrier film and foam froth) is passed through a hot-air oven in which an air temperature of 440° F. is maintained and the speed of passage through the air-oven is so adjusted as to result in a residence time of 2 minutes.

The composite end product is a breathable multi-layer structure with very firm adherence of the individual layers to each other.

EXAMPLE IV

Forming a laminated structure including a polyvinylchloride foam and a compatible polyurethane barrier film.

(A) Barrier film formula 2.0 oz./yd. thermoplastic polyurethane compound. (B. F. Goodrich—Estane.)

(B) Chemically blown foam formula

| | Pts. by wt. |
|---|---|
| Polyvinylchloride resin (B. F. Goodrich Geon 120×222) | 100 |
| Bonding Agent TN [1] (Verona Dyestuff, Inc. or Farbenfabrik Bayer) | 4 |
| Dioctylphthalate | 60 |
| Butylbenzylphthalate | 20 |
| Epoxidized soybean oil | 5 |
| Ba-Cd-Zn liquid stabilizer | 3 |
| Titanium dioxide (pre-dispersed) | 6 |
| Azobisformamid (Kempore R 125) | 2 |

[1] A liquid compatible with vinyl plastisol and containing the ingredients of a polyurethane in a form which allows a fusion or cross-linked bonding to take place between the plastisol foam and the polyurethane barrier film at oven fusion temperatures of 330° F. to 450° F.

Conditions:

Substrate 4 yd./lb. cotton jersey 60" wide barrier film—
2.0 oz./yd.²
Foam coat 12 oz./yd.²
Oven temperature 425° F.
Oven residence: 70 secs.
Composite thickness after blowing—.048".

EXAMPLE V

Forming a laminated structure including a polyethylene foam.

(A) Barrier film formula

Polyethylene (Hostalen 6D6250 Farbwerke Hoest, Frankfurt) _____ 100
Film weight: 2.0 oz./yd.²

(B) Foam formula (powder slurry)

| | Pts. by wt. |
|---|---|
| Polyethylene powder (U.S.I. Microthene) | 100.0 |
| Thickening agent (Union Carbide Corp.—Carbopol) | 8.0 |
| H₂O | 40.0 |
| Blowing agent—Azobisformamide (Kempore R 125—National Polychemicals, Wilmington, Mass.) | 4.0 |

Oven conditions: 385° F., 85 secs. residence time.

EXAMPLE VI

Forming a laminated structure including another type of breathable foam.

According to the present example, a laminated structure is formed including a breathable foam system based on a free-flowing powder dryblend of P.V.C., plasticizer, stabilizer, filler and blowing agent. The variation being the application and metering system for coating a free-flowing powder dryblend onto the barrier film-treated substrate. Although a conventional knife coater may be used, better results may be had by use of a positive powder feed system incorporating suitable agitation and screening to keep the powder fluidized in the coating bank while it is spread-coated onto the barrier-treated substrate with a coating blade of suitable configuration. The following formulation results in a foam of approximately 0.75 specific gravity, Shore hardness of 35, which foam may be termed gas-permeable or breathable:

| | Pts. by wt. |
|---|---|
| Polyvinylchloride resin | 100 |
| Dioctylphthalate | 70 |
| Epoxidized soybean oil | 10 |
| Titanium dioxide | 5 |
| Azobisformamide | 3 |
| Stearic acid | 1 |
| Cab-O-Sil M–5 (Cabot Corporation) | 5 |
| Solka-floc BW 100 (Brown & Co.) | 3 |

The above free-flowing powder is applied to the free face of a barrier film containing P.V.C. The barrier film promotes bond between the base substrate and the oven blown powder based vinyl compound. Upon oven exposure at fusion temperatures of 340 to 440° F. and residence of suitable duration, the barrier film is rendered discontinuous and the total composite is breathable.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of forming a laminated structure comprising the steps of bonding a preformed, substantially shape-retaining intermediate barrier layer to at least one face of a carrier, said face being formed with projecting and recessed portions, in such a manner that said preformed intermediate barrier layer will adhere to said projecting portion substantially without filling said recessed portions; forming on said intermediate barrier layer opposite said carrier an outer deformable, hardenable layer of material during hardening thereof to be bonded to said preformed intermediate barrier layer; and hardening said hardenable layer while simultaneously bonding the same to said intermediate barrier layer, thereby forming a laminated structure substantially without filling the recessed portions of said carrier face due to the interposition of said barrier layer between said carrier and said outer layer.

2. A method as defined in claim 1, wherein said carrier is a sheet of fibrous material.

3. A method as defined in claim 2, wherein said carrier is a sheet of textile material.

4. A method as defined in claim 3, wherein said textile material is a woven, knitted or non-woven fabric.

5. A method as defined in claim 1, wherein said intermediate layer is a film of thermoplastic material and is adhered to said carrier by contact therewith at a temperature at least equal to the softening point of said thermoplastic material.

6. A method as defined in claim 1, wherein said intermediate layer is adhered to said carrier by means of an interposed adhesive.

7. A method as defined in claim 1, wherein said material of said hardenable outer layer includes a latent blowing agent.

8. A method as defined in claim 7, wherein said blowing agent-containing layer, while in contact with said intermediate layer, is heated to the activation temperature of said blowing agent and to the fusion temperature of said intermediate and outer layers so as to cause pore formation in the said hardenable layer and adherence of the latter to said intermediate layer.

9. A method as defined in claim 1, wherein said intermediate layer is a thermoplastic film.

10. A method as defined in claim 9, wherein said hardenable layer consists essentially of a plastisol and said thermoplastic film is substantially impermeable for said plastisol during hardening of said hardenable layer and bonding thereof to said intermediate layer.

11. A method as defined in claim 10, wherein said plastisol and said intermediate layer include significant proportions of a vinyl polymerizate.

12. A method as defined in claim 11, wherein said hardenable layer includes an effective amount of a heat activatable blowing agent.

13. A method as defined in claim 1, and including the step of applying a skin layer to the outer face of the hardened outer layer.

References Cited
UNITED STATES PATENTS

| | | | |
|---|---|---|---|
| 2,739,093 | 3/1956 | Bull | 156—79 |
| 2,753,276 | 7/1956 | Brochhagen et al. | 156—79X |
| 3,133,853 | 5/1964 | Knox | 156—79X |
| 3,402,088 | 9/1968 | Young et al. | 156—290X |

BENJAMIN R. PADGETT, Primary Examiner

S. HELLMAN, Assistant Examiner

U.S. Cl. X.R.

156—290, 324